3,215,725
BIS-α-CYANO-β,β-DIPHENYLACRYLIC ACID
DERIVATIVES
Albert F. Strobel, Delmar, and Sigmund C. Catino, Castleton, N.Y., assignors to General Aniline & Film Corporation, New York, N.Y., a corporation of Delaware
No Drawing. Filed Nov. 2, 1961, Ser. No. 149,525
12 Claims. (Cl. 260—465)

This invention relates to new and useful compounds which impart to organic materials superior resistance to degradation and deterioration when they are exposed to actinic radiation, and in particular to ultra-violet radiation. This invention further relates to processes for the preparation of new and useful compounds of the type hereinbefore described. The compounds with which this invention is concerned are characterized as bis-α-cyano-β,β-diphenylacrylic acid derivatives.

Various organic compounds exhibit the power to absorb electromagnetic radiations within the band of 2900 to 3700 A. and when incorporated in various plastic materials such as transparent sheets, the resultant sheet acts as a filter for all of the radiation passing through and will transmit only such radiations are are not absorbed by the sheet and/or the absorbing agent. It is thus possible to screen out undesirable radiations and utilize the resulting transparent sheet as a filter in many technical and commercial applications such as wrappings for food products and the like.

Numerous organic compounds have been suggested as absorbents for the range of radiations described above, which range is designated as the ultra-violet range. Such uses include incorporation in plastic sheet materials and the stabilization in general of transparent plastic bodies. By far, the greatest concern with respect to ultra-violet radiations is with those radiations which come from the sun. Most of these radiations have wave lengths between 250 and 400 millimicrons. The effects of such radiation on the human skin, producing sunburn and suntan are of course well known. Other effects, however, of great commercial importance relate to the photochemical degradation caused by ultra-violet radiation. Many commercial products are either unstable when subjected to such radiations, or are affected to the extent that they become undesirable or unsalable. Many plastic materials, when exposed to this radiation, undergo substantial degradation resulting in the development of undesirable color bodies and subsequent loss of transparency. Food products, in addition to becoming discolored, often become unfit for human consumption. Thus, prolonged exposure of fruits, edible oils, butter and other prepared foods will spoil and turn rancid on exposure to ultra-violet light. It is well known that colored objects such as dyed textiles will fade on exposure to sunlight, and in particular to ultra-violet light. Many plastics, in addition to developing color formation and reduction in transparency, become brittle, lose their elasticity, crack and eventually completely deteriorate on exposure to sunlight. Paints, varnishes, lacquers and the like also are prone to these effects, even though here the transparency property may not be paramount.

We have discovered that by combining bis-α-cyano-β,β-diphenylacrylic acid derivatives with organic materials, there results compatible combinations with a vast number of film forming plastics, resins, gums, waxes and the like, which combinations further exhibit outstanding ultra-violet absorbing properties within the generally encountered ultra-violet region of 250 to 400 millimicrons. The compounds with which this invention is concerned, even though they exhibit outstanding absorbing properties close to the visibile region of the electro magnetic field, nevertheless are essentially colorless compounds and can be employed with the assurance that they will not contribute to color in normally colorless formulations, nor will they affect the color of a colored formulation such as a paint film or a dyed textile. Many of the compounds of this invention also absorb some visible light on the violet end of the spectrum which renders them particularly useful in many formulations which are susceptible to visible light degradation. Thus polyesters and polyethylene are known to be so characterized, and the stabilization of these materials is extremely successful when using the compounds herein contemplated.

The compounds of this invention, additionally, are outstanding in that they do not require a phenolic hydroxyl group in order to achieve light stability. The heretofore used hydroxybenzophenone absorbers must have such a grouping. The presence of an hydroxyl which is capable of salt formation renders these absorbers unsuitable for use in alkaline media and particularly in alkaline plastic materials such as epoxys, melamines and the like. While the compounds of the present invention do not require an hydroxyl group, the presence thereof is not disadvantageous, or a detriment where alkaline sensitivity is no problem.

It is therefore an object of the present invention to provide new and useful compounds characterized by outstanding ultra-violet absorbing properties.

It is still another object of this invention to provide new and useful bis-α-cyano-β,β-diphenylacrylic acid derivatives which are outstanding ultra-violet absorbing compounds.

It is a still further object of the present invention to provide processes for the preparation of new and useful ultra-violet absorbing compounds.

It is a still further object of the present invention to provide processes for the preparation of new and useful ultra-violet absorbing compounds which are derivatives of bis-α-cyano-β,β-diphenylacrylic acid.

Other objects will appear hereinafter as the description proceeds.

The bis-α-cyano-β,β-diphenylacrylic acid derivatives which are contemplated in this invention are devoid of nitro groups and are characterized by the following general formula:

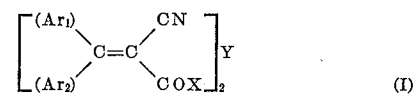

(I)

wherein $Ar_1$ and $Ar_2$ represent aromatic carbocyclic nuclei devoid of nuclear bonded amino groups, X is oxygen or N—$R_1$ and Y is an organic bridge, e.g., alkylene, arylene or hetero or substituted forms thereof, and $R_1$ is an organic radical or hydrogen.

The formulas of the compounds embraced by Formula I are:

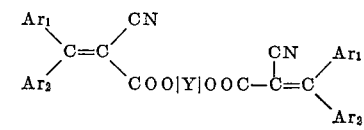
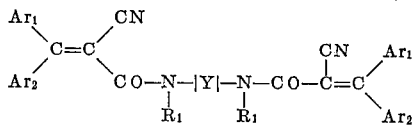

(II)
(III)

wherein Y and R₁ have the meanings designated above.

Among specific bridging radicals, there may be used:

—CH₂CH₂—
—CH₂CH₂CH₂—
—CH₂CH₂CH₂CH₂—
—CH₂CH₂CH₂CH₂CH₂—

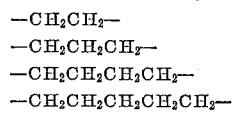
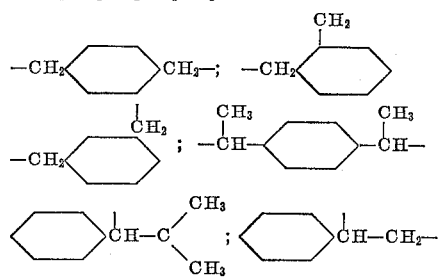
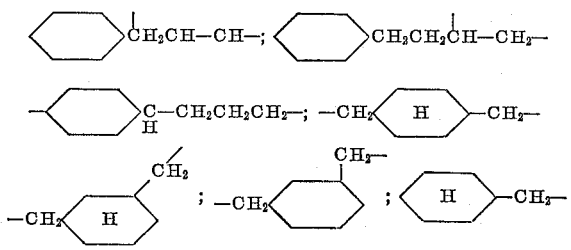
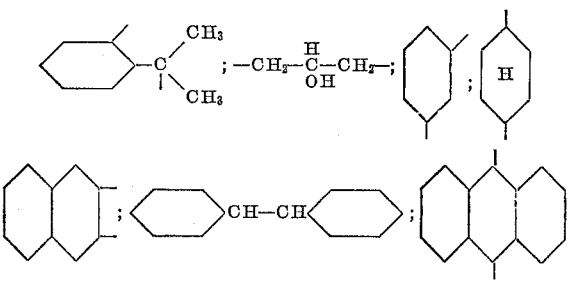
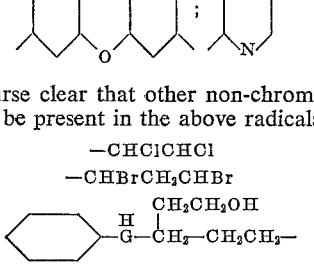

It is of course clear that other non-chromophoric substituents may be present in the above radicals, e.g., —CHClCHCl
—CHBrCH₂CHBr and the like.

Suitable R₁ substituents include any alkyl, substituted alkyl, aryl, substituted aryl, hetero, etc., and the like, such as:

Methyl
Ethyl
n-Propyl
Iso-propyl
n-Butyl
Iso-butyl
Tertiary-butyl
Secondary-butyl
n-Amyl
Iso-amyl
Tertiary-amyl and the other isomeric amyls
n-Hexyl
Iso-hexyl and the other isomeric hexyls
n-Heptyl
Iso-heptyl and the other isomeric heptyls
n-Promary nonyl (nonyl-1)
    Nonyl-(2)
    Nonyl-(3)
    Nonyl-(5)
2-methyl-octyl-2
4-ethyl-heptyl-4
2-methyl-4-ethyl-hexyl-4
n-Primary octyl
    octyl-(2) (capryryl)
2-methyl-3-ethyl-pentyl-3
2,2,4-trimethyl-pentyl-4
2-ethyl-hexyl-1
3-ethyl-hexyl-3
2-methyl-heptyl-2
3-methyl-heptyl-3
4-methyl-heptyl-4
n-Primary decyl (decyl-1)
Decyl-4 (secondary decyl)
2-ethyl-octyl-3 (tertiary decyl)
4-propyl-heptyl-4 (tertiary decyl)
Undecyl-1 (n-primary decyl)
Undecyl-2 (n-secondary decyl)
Dodecyl-1 (n-dodecyl)
Tridecyl-1 (n-tridecyl)
Tridecyl-7
3-ethyl-undecyl
Tetradecyl-1 (n-tetradecyl)
Pentadecyl-1 (n-pentadecyl)
Pentadecyl-8
Hexadecyl (cotyl)
Heptadecyl-9
Octadecyl-1
2-methyl heptadecyl-2
Eicosyl-1
Docosyl-1
Tricosyl-12
Tetracosyl
Tricapryl
Pentacosyl
Hexacosyl
Heptacosyl
Octacosyl
Nonacosyl
Myristyl (30 carbons)
Alkenyl
Allyl (CH₂=CHCH₂—)
Methallyl (CH₂=C(CH₂)CH₂—)
Crotyl (CH₃CH=CHCHCH₂—)
Butenyl-1

(CH₂=CH—CH—CH₃)

Pentenyl-1
γ-Isopropyl allyl
β-Ethyl-γ-propyl allyl
2-methyl-octenyl-6
Decenyl-1
Decenyl-2
Undecenyl-
Dodecenyl-2
Octadecenyl
Docosenyl
Pentamethyl eicosenyl
Cyanoethyl
Cyan-n-propyl
Cyano-isopropyl Cyano-n-propyl
Cyano-n-butyl
Cyano-isobutyl
Cyano-n-amyl
Cyano-isoamyl
Cyanohexyl
Cyanoheptyl
Cyano-n-octyl
Cyano-nonyl
Cyanodecyl
Cyanolauryl
Cyanostearyl and the like
Hydroxyethyl
Hydroxy-n-propyl
Hydroxy-isopropyl
Hydroxy-n-butyl
Hydroxy-isobutyl
Hydroxy-n-amyl
Hydroxy-isoamyl
Hydroxy-hexyl
Hydroxy-heptyl
Hydroxy-nonyl
Hydroxy-decyl
Hydroxy-lauryl
Hydroxy-stearyl and the like,
Carbomethoxyethyl
Carbomethoxypropyl
Carbomethoxybutyl
Carbomethoxyamyl
Carbomethoxyhexyl
Carbethoxyethyl
Carbethoxypropyl
Carbethoxybutyl, etc.
Carbopropoxyethyl
Carbopropoxypropyl
Carbopropoxybutyl, etc.
Carbobutoxyethyl
Carbobutoxybutyl, etc.
Chloroethyl
Chloropropyl (N-propyl, isopropyl)
Chlorobutyl (N-butyl, isobutyl, etc.)
Chloroamyl
Chlorohexyl
Chlorodecyl
Chlorolauryl, and the like
Bromoethyl
Bromopropyl (N-propyl, isopropyl)
Bromobutyl (N-butyl, isobutyl, etc.)
Bromoamyl
Bromohexyl
Bromodecyl
Bromolauryl, and the like.
Methoxyethyl
Methoxypropyl (N-propyl, isopropyl)
Methoxybutyl (N-butyl, isobutyl, etc.)
Methoxyamyl
Methoxyhexyl
Methoxydecyl
Methoxylauryl, and the like.
Ethoxyethyl
Ethoxypropyl (N-propyl, isopropyl)
Ethoxybutyl (N-butyl, isobutyl, etc.)
Ethoxyamyl
Ethoxyhexyl
Ethoxydecyl
Ethoxylauryl, and the like
Hydroxyethoxyethyl
Hydroxyethoxypropyl
Hydroxyethoxybutyl
Hydroxyethoxyamyl
Hydroxypropoxyethyl
Hydroxypropoxypropyl
Hydroxypropoxybutyl
Hydroxypropoxyamyl
Hydroxybutoxyethyl
Hydroxybutoxypropyl
Hydroxybutoxybutyl
Hydroxobutoxyamyl
Aryl:
    Phenyl
    Tolyl
    Xylyl
    Cumyl
    $\alpha$-Naphthyl
    $\beta$-Naphthyl
    $\alpha$-Anthraquinonyl
    $\beta$-Anthraquinonyl
    $\gamma$-Anthraquinonyl
    Phenanthranyl
    Diphenyl and the alkyl substituted derivative thereof
substituted aryls, e.g.:
    Anisole
    Phenetole
    p-Diethoxyphenyl
    1-methoxy phenanthryl
    $\alpha$-Naphthylmethylether
    $\beta$-Naphthylmethylether
    $\alpha$-Naphthylethylether
    $\beta$-Naphthylethylether
    Hydroxyethyl phenyl
    Hydroxypropyl phenyl
    Chlorophenyl
    Bromophenyl
    1,2-dichlorophenyl
    1,3-dichlorophenyl
    1,3,5-trichlorophenyl
1,2-dibromophenyl
$\alpha$-Chlorotolyl
m-Chlorotolyl
m-Bromotolyl
Bromo-o-xylyl
$\alpha,\beta$-Dichloro naphthyl
4-bromoacenaphthyl
Carboxyphenyl
Carboxytolyls
Carboxyxylyls
Carbalkoxylphenyls, e.g.:
    Carbomethoxylphenyl
    Carboethoxylphenyl
Carbalkoxyltolyls, e.g.:
    Carbomethoxytolyls
Acetophenyl
Propiophenyl
Butyrophenyl
Lauroylphenyl
Stearoylphenyl
p-Acetotolyl
o-Acetotolyl
$\alpha$-Benzoyl naphthyl
$\beta$-Benzoyl naphthyl
Acetaminophenyl
Acet-methylamino phenyl
o-Acetoaminotolyl
p-Acetoaminotolyl
$\alpha$-Acetoaminonaphthyl
$\beta$-Acetoaminonaphthyl
Propio-aminophenyl
Butyro-aminophenyl
o-Propio-aminotolyl
p-Propio-aminotolyl
o-Butyroaminotolyl
p-Butyroaminotolyl
o-Lauroylaminotolyl
p-Lauroylaminotolyl
o-Stearoylaminotolyl
o-Stearoylaminotolyl
Sulfamyl phenyl
Sulfamyl naphthyl
Alkaryls, e.g.:
    Benzyl
    Phenethyl Phenyl n-propyl
Phenyl iso-propyl
Phenyl iso-butyl
2,4-dimethyl benzyl
2-methyl benzyl
4-methyl benzyl, and the like In the above Formulas I, II and III it is preferred that $(Ar)_1$ and $(Ar)_2$ be phenyl or substituted phenyl (devoid of nitro or nuclear bonded amino groups). As suitable substituents in $(Ar)_1$ and $(Ar)_2$ any of the $R_1$ radicals described above may be used.

In addition to the above contemplated derivatives, polyoxyalkylated derivatives thereof are within the purview of this invention. Any of the aforementioned derivatives containing at least one reactive hydrogen atom may be reacted with an alkylene oxide or a compound functioning as an oxide such as ethylene oxide, propylene oxide, butylene oxide, butylene dioxide, cyclohexane oxide, glycidol, epichlorohydrin, butadiene dioxide, isobutylene oxide, styrene oxide and mixtures thereof, and the like to yield the corresponding polyoxyalkylated product. From 1 up to about 100 oxyalkyl groups may be introduced into the molecule.

If the phenolic hydroxyls are not to be oxyalkylated they may be esterified with, for example, benzene sulfonyl chloride and then later regenerated. Alternatively, the phenolic hydroxyls may be oxyalkylated to the exclusion of amide grouping since the latter react much more slowly.

The general procedure for preparing the compounds of this invention involves a condensation of the benzophenone compound with the di-cyanoacetate or amide under conditions to effect elumination of water. Acid catalyst are preferred.

Suitable benzophenone compounds include:

2-methylbenzophenone
3-methylbenzophenone
4-methylbenzophenone
2-chlorobenzophenone
3-chlorobenzophenone
4-chlorobenzophenone
2-bromobenzophenone
3-bromobenzophenone
4-bromobenzophenone
2-iodobenzophenone
3-iodobenzophenone
4-iodobenzophenone
4-fluorobenzophenone
4-cyanobenzophenone
Benzophenonecarboxylic acid(2)
Benzophenonecarboxylic acid(3)
Benzophenonecarboxylic acid(4)
2-benzoylbenzoic acid methyl ester
2-benzolybenzoic acid ethyl ester
2-benzoylbenzoic acid amide
2-benzoylbenzoic acid monoethyl amide
3-benzoylbenzoic acid methyl ester
3-benzoylbenzoic acid ethyl ester
4-benzoylbenzoic acid methyl ester
4-benzoylbenzoic acid ethyl ester
2-sulfonamidobenzophenone
4-sulfonamidobenzophenone
4-ethylbenzophenone
2,4-dimethylbenzophenone
2,5-dimethylbenzophenone
3,4-dimethylbenzophenone
2,4'-dimethylbenzophenone
3,4'-dimethylbenzophenone
4,4'-dimethylbenzophenone
4-propylbenzophenone
4-isopropylbenzophenone
2,4,5-trimethylbenzophenone
2,4,6-trimethylbenzophenone
2,4,2'-trimethylbenzophenone
2,4,3'-trimethylbenzophenone
2-methyl-5-isopropylbenzophenone
2,3,4,6-tetramethylbenzophenone
2,3,5,6-tetramethylbenzophenone
2,4,2',4'-tetramethylbenzophenone
2,5,2',5'-tetramethylbenzophenone
2,4,3',4'-tetramethylbenzophenone
2,4,6,3',5'-pentamethylbenzophenone
2,2'-dimethyl-5,5'-di-isopropylbenzophenone
4-n-octylbenzophenone
4-cyclohexylbenzophenone
2-benzoylbenzophenone
4,4'-dicyclohexylbenzophenone
4,4'-di-p-toluylbenzophenone
2-phenylbenzophenone
3-phenylbenzophenone
4-phenylbenzophenone
2-propenylbenzophenone
2-allylbenzophenone
N,N-dimethyl-2-sulfonamidobenzophenone
4-phenethylbenzophenone
2-carboxamidobenzophenone
2-hydroxybenzophenone
3-hydroxybenzophenone
4-hydroxybenzophenone
2-methoxybenzophenone
3-methoxybenzophenone
4-methoxybenzophenone
2-ethoxybenzophenone
3-ethoxybenzophenone
4-ethoxybenzophenone
2-phenoxybenzophenone
3-phenoxybenzophenone
4-phenoxybenzophenone
4-xylyloxybenzophenone
4-(m-tolyloxy)benzophenone
4-(p-tolyloxy)benzophenone
4-isopentyloxybenzophenone
2-acetoxybenzophenone
3-acetoxybenzophenone
4-acetoxybenzophenone
4-cyclohexyloxybenzophenone
4-benzyloxybenzophenone
2,4'-difluorobenzophenone
4,4'-difluorobenzophenone
2,4'-difluorobenzophenone
4,4'-difluorobenzophenone
2,4-dibromobenzophenone
2,6-dibromobenzophenone
2,2'-dibromobenzophenone
2,4'-dibromobenzophenone
3,3'-dibromobenzophenone
4,4'-dibromobenzophenone
4,4'-dichlorobenzophenone
2,4-dichlorobenzophenone
2,4'-dichlorobenzophenone
3,4-dichlorobenzophenone
4,4'-di-iodobenzophenone
3,5-di-iodobenzophenone
4-chloro-4'-bromobenzophenone
2,2'-di-iodobenzophenone
2,4-dichloro-2',4'-dibromobenzophenone
2,4,6-tribromobenzophenone
2,4,6-trichlorobenzophenone
2,5,2',5'-tetrachlorobenzophenone
2,4,2',4'-tetrachlorobenzophenone
2-bromo-4'-phenylbenzophenone
2-chloro-4'-phenylbenzophenone
2-bromo-2',4,4',6,6'-pentamethylbenzophenone
2-hydroxy-5-octylbenzophenone
4-chloro-3',4'-dimethylbenzophenone
4-chloro-3,4'-dimethylbenzophenone
2-chloro-2',4'-dimethylbenzophenone
2'-bromo-4-methylbenzophenone
2-hydroxy-4-methylbenzophenone
4-hydroxy-2-methylbenzophenone 4-hydroxyethoxybenzophenone
3-hydroxy-4-methoxybenzophenone
2-hydroxy-4-methoxy-3-methylbenzophenone
4'-methoxy-2-methylbenzophenone
4-methoxy-3-methylbenzophenone
6-methoxy-3-methylbenzophenone
6-hydroxy-3-methylbenzophenone
4-methoxy-2-methylbenzophenone
4,4'-dimethoxybenzophenone
4,4'-diethoxybenzophenone
4',4'-di-isopropoxybenzophenone
2,2'-dimethoxbenzophenone
2,3-dimethoxybenzophenone
2,4'-dimethoxybenzophenone
4-methoxy-2,5-dimethylbenzophenone
4-hydroxy-2,5-dimethylbenzophenone
2-hydroxy-3,5-dimethylbenzophenone
5-hydroxy-2,4-dimethylbenzophenone
5-methoxy-2,4-dimethylbenzophenone
5-ethoxy-2,4-dimethylbenzophenone
4-methoxy-3-methyl-6-isopropylbenzophenone
4-hydroxy-3-methyl-6-isopropylbenzophenone
4-hydroxy-2-methyl-5-isopropylbenzophenone
4-acetoxy-2-methyl-5-isopropylbenzophenone
4-acetoxy-3-methyl-5-isopropylbenzophenone
3-ethoxy-3',4,4'-trimethoxybenzophenone
3-ethoxy-3',4,4'-trimethoxybenzophenone
4-ethoxy-3,3',4'-trimethoxybenzophenone
4-(p-methoxyphenyl)-4'-phenylbenzophenone
4,4'-bis(p-methoxyphenoxy)benzophenone
4-(p-hydroxyphenyl)benzophenone
4-(p-methoxyphenyl)benzophenone
4-methoxy-3,5-dimethylbenzophenone
6-ethoxy-3-methylbenzophenone
3-chloro-4(2-hydroxyethoxy)benzophenone
2'-chloro-4-methoxybenzophenone
4'-chloro-4-methoxybenzophenone
3-fluoro-4-hydroxybenzophenone
5-fluoro-2-hydroxybenzophenone
3-fluoro-4-methoxybenzophenone
5-fluoro-2-methoxybenzophenone
4-fluoro-2-methylbenzophenone
4'-bromo-4-hydroxybenzophenone
4'-bromo-4-ethoxybenzophenone
3-iodo-4-methoxybenzophenone
3-iodo-4-hydroxybenzophenone
4'-iodo-4-ethoxybenzophenone
5-chloro-2-hydroxy-4-methylbenzophenone
3'-chloro-2-hydroxy-4-methylbenzophenone
3'-chloro-4-hydroxy-3-methylbenzophenone
3'-chloro-4-methoxy-3-methylbenzophenone
5'-chloro-2'-methoxy-3-methylbenzophenone
5'-iodo-2-hydroxy-3-methylbenzophenone
2'-iodo-6-hydroxy-3-methylbenzophenone
5-iodo-6-hydroxy-3-methylbenzophenone
3'-iodo-4'-methoxy-2-methylbenzophenone
3'-iodo-4'-hydroxy-2-methylbenzophenone
5'-iodo-2'-methoxy-2-methylbenzophenone
5'-iodo-2'-hydroxy-2-methylbenzophenone
4'-bromo-6-hydroxy-3-methylbenzophenone
2'-bromo-6-hydroxy-3-methylbenzophenone
2'-bromo-6-methoxy-3-methylbenzophenone
2-chloro-2'-bromo-4-hydroxybenzophenone
3,5-dibromo-4-hydroxybenzophenone
3,5-dibromo-4-ethoxybenzophenone
3,5-di-iodo-4-hydroxybenzophenone
3,5-dichloro-2,2',4,6'-tetramethoxy-4'-methylbenzophenone
3,3'-difluoro-4,4'-dihydroxybenzophenone
3,3'-difluoro-4,4'-dimethoxybenzophenone
3,3'-difluoro-4,4'-diethoxybenzophenone
3,3'-dibromo-5,5'-difluoro-4,4'-dihydroxybenzophenone
4'-tertiarybutyl-2'-isopropenyl-2,3,5,6-tetramethylbenzophenone
2,2'-dihydroxy-4,4'-dipropoxybenzophenone
2,5-dimethoxy-3,4-dimethylbenzophenone
4,4'-dimethoxy-3,3'-dimethylbenzophenone
2,6-dimethoxy-2'-methylbenzophenone
2,6-dimethoxy-3'-methylbenzophenone
3,3'-diethoxy-4,4'-dimethoxybenzophenone
3,3',4,4',5,5'-hexamethoxybenzophenone
2,2'-dihydroxy-4,4'-bis(octyloxy)benzophenone
2,2'-dihydroxy-4,4'-bis(hexyloxy)benzophenone
3,3'-dimethoxy-4,4'-bis(benzyloxy)benzophenone The following examples will serve to illustrate the present invention without being deemed limitative thereof. Parts are by weight unless otherwise indicated.

*Example 1*

Preparation of

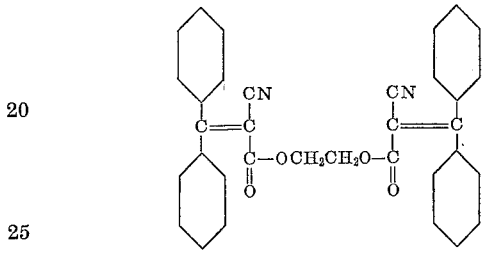

This compound is prepared by heating .5 mole of benzophenone with .25 mole of ethylene glycol di-(α-cyanoacetate) in the presence of 5.0 g. ammonium acetate, 20 cc. glacial acetic acid and 125 ml. of benzene at reflux for 10 hours. The benzene is then distilled off and the residue diluted with 250 mls. water and filtered. It is recrystallized from 500 ml. of an ethanol-water mixture in the ratio of 1:2. The intermediate

is prepared as described in U.S. Patent 2,426,056, Example 1 (using excess cyanoacetic acid) in the following manner.

One mole of ethylene glycol, 3 moles of cyanoacetic acid, 10 g. toluenesulfonic acid and 180 cc. benzene are heated under reflux, removing water and returning benzene to the reaction for 18 hours. Thereafter the benzene is distilled off and the pH adjusted to 8 with sodium carbonate. Ethyl acetate is employed to extract the diester and the latter is recovered by distilling off the ethyl acetate.

*Examples 2–35*

Example 1 is repeated using the following ketones.

| Examples: | Benzophenone compound |
|---|---|
| 2 | 2-methyl- |
| 3 | 4-methyl- |
| 4 | 3-chloro- |
| 5 | 4-bromo- |
| 6 | 4-cyano- |
| 7 | 2-carboxy- |
| 8 | 2-carbomethoxy- |
| 9 | 2-carbethoxy- |
| 10 | 2-carboxamido- |
| 11 | 4-sulfamyl- |
| 12 | 3,4-dimethyl- |
| 13 | 3,4'-dimethyl- |
| 14 | 4-isopropyl- |
| 15 | 4-n-octyl- |
| 16 | 4-cycohexyl- |
| 17 | 3-phenyl- |
| 18 | 2-allyl- |
| 19 | 4-phenethyl- |
| 20 | 2-hydroxy- |
| 21 | 4-methoxy- |
| 22 | 4-phenoxy- |
| 23 | 2-acetoxy- |
| 24 | 4-benzyloxy- |
| 25 | 4,4'-dichloro- |
| 26 | 2,4-dichloro- |

Examples:—Continued    Benzophenone compound
27_____    2-hydroxy-5-isooctyl-
28_____    4-chloro-3',4'-dimethyl.
29_____    4-hydroxy-2-methyl.
30_____    4-hydroxyethoxy-
31_____    4-methoxy-3-methyl.
32_____    4,4'-dimethoxy-
33_____    4-(p-hydroxyphenyl)-
34_____    4'-chloro-4-methoxy-
35_____    4,4'-dimethoxy-3,3'-dimethyl-

Examples 36–43

In each of the following examples the previous examples are repeated employing the di-($\alpha$-dyano) esters indicated in place of the ethylene glycol ester of Example 1.

Example    Bis-ester or amide
36_____  1,4-xylylenglycol di-($\alpha$-dyanoacetate).
37_____  1-phenyl-2,3-propyleneglycol di-($\alpha$-dyanoacetate).
38_____  1,3-glyceryl-bis($\alpha$-cyanoacetate).
39_____  2-5-dihydroxy pyridine (1 mole) esterified with cyanoacetic acid (2 moles).
40_____  Acenaphthyleneglycol (1 mole) esterified with cyanoacetic acid (2 moles).
41_____  Ethylene diamine (1 mole) reacted with cyanoacetic acid (2 moles).
42_____  N,n'-bis(cyanoacetyl) pentamethylenediame.
43_____  N,N'-p-phenylene bis-cyanoacet-amide.

Example 44

The condensation product of benzophenone with 1,3-glyceryl-bis($\alpha$-cyanoacetate) is added to a mixture of a steam bath meet of:

9 oz. carnauba wax
1.5 pints turpentine
1.75 pints water containing 2 oz. soap to contain 2% of absorber based on the weight of carnauba wax. Excellent protection to stained and varnished oak is obtained.

Example 45

The absorber of Example 44 is polyoxyethylated by adding to 1 mole thereof 1.2% by weight of potassium hydroxide and then 6 moles of ethylene oxide in an autoclave at 80° C.

Example 46

Example 45 is repeated using 35 moles of ethylene oxide to yield a product containing 35 oxyethyl groups.

Example 47

Example 45 is repeated using 10 moles of propylene oxide in lieu of ethylene oxide. The product contains 10 oxypropyl groups.

Example 48

The product of Example 47 is further oxyethylated as above with 10 moles of ethylene oxide to give a product containing 10 oxypropyl groups, 9 oxyethyl groups, and a terminal hydroxyethyl group.

Example 49

The product of Example 11 is oxyethylated with 4 moles of ethylene oxide as above to yield a water and oil soluble surface active ultra-violet absorbing compound.

The compounds of this invention are in general soluble in a great variety of solvents, plastics, resins, waxes and the like, and therefore are particularly adaptable for the stabilization of a great variety of different types of organic materials. The non-oxyalkylated products are insoluble in water. Those compounds which contain smaller amounts of oxyalkly groups, that is, up to about 4 to 6 groups per molecule, are in general soluble in the more polar organic solvents and fairly readily dispersible in water. The compounds containing larger amounts of alkylene oxide, that is, above about 6 mols per mol of reactive hydrogen containing compound, range from soluble to extremely soluble in water, the solubility increasing as the number of oxyalkyl groups are increased.

The ultra-violet absorbers of the present invention may be used to stabilize resins and plastics in the form of films and molded products and in the form of clear, opaque, semi-opaque or translucent materials. In addition, foam plastics, fibers, pigments, polishes, creams, lotions, and the like may be protected. The compounds disclosed herein give outstanding protection to paint, enamel and varnish films against fading of pigments and dyes contained therein.

Other variations in and modifications of the described processes which will be obvious to those skilled in the art can be made in this invention without departing from the scope or spirit thereof.

We claim:
1. A compound devoid of nitro groups of the formula:

$$\left[ \begin{array}{c} (Ar_1) \\ (Ar_2) \end{array} C=C \begin{array}{c} CN \\ C-X-Y \\ \parallel \\ O \end{array} \right]_2$$

wherein
(1) $Ar_1$ and $Ar_2$ represent benzene nuclei devoid of nuclear bonded amino groups;
(2) X is selected from group consisting of oxygen and NR;
(3) Y is an organic radical selected from the group consisting of alkylene, phenylene and naphthylene, and
(4) R is selected from the group consisting of
 (a) Hydrogen;
 (b) Alkylene radical of 1 to 30 carbon atoms;
 (c) Alkenyl radical of 3 to 25 carbon atoms;
 (d) Hydroxy, chloro, bromo, alkoxy, carbalkoxy, hydroxy alkoxy and phenyl derivatives of the said 1 to 30 carbon atoms alkyl radicals;
 (e) Phenyl;
 (f) Alkyl phenyl;
 (g) Chloro phenyl;
 (h) Bromo phenyl;
 (i) Oxy phenyl;
 (j) Carboxy phenyl;
 (k) Carboalkoxy phenyl;
 (l) Carboxylic acyl phenyl containing up to 18 carbon atoms in the acyl moiety; and
 (m) Sulfonyl phenyl radicals.

2. A compound as defined in claim 1 wherein X is oxygen and Y is alkylene.
3. A compound as defined in claim 1 wherein X is oxygen and Y is phenylene.
4. A compound as defined in claim 1 wherein X is N-R and Y is alkylene.
5. A compound as defined in claim 1 wherein X is N-R and Y is phenylene.
6. A compound as defined in claim 4 wherein R is hydrogen.
7. A compound as defined in claim 5 wherein R is hydrogen.
8. A compound as defined in claim 4 wherein R is alkyl.
9. A compound as defined in claim 5 wherein R is alkyl.
10. A compound as defined in claim 2 wherein Y is ethylene.
11. A compound as defined in claim 2 wherein Y is propylene.

12. A compound of the formula:
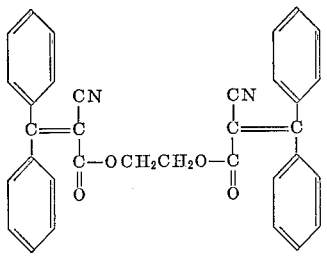
No references cited.
CHARLES B. PARKER, *Primary Examiner.*
IRVING MARCUS, DUVAL T. McCUTCHEN,
*Examiners.*

UNITED STATES PATENT OFFICE
CERTIFICATE OF CORRECTION

Patent No. 3,215,725                                              November 2, 1965

Albert F. Strobel et al.

It is hereby certified that error appears in the above numbered patent requiring correction and that the said Letters Patent should read as corrected below.

Column 12, line 41, for "Alkylene radical of 1 to 30 carbon atoms" read -- Alkyl radical of from 1 to 30 carbon atoms --.

Signed and sealed this 13th day of December 1966.

(SEAL)
Attest:

ERNEST W. SWIDER                                      EDWARD J. BRENNER
Attesting Officer                                             Commissioner of Patents